April 27, 1954　　　　　M. C. KERN　　　　　2,676,816
COMBINED WINDOW GUARD AND TRAY FOR VEHICLES
Filed Jan. 26, 1953
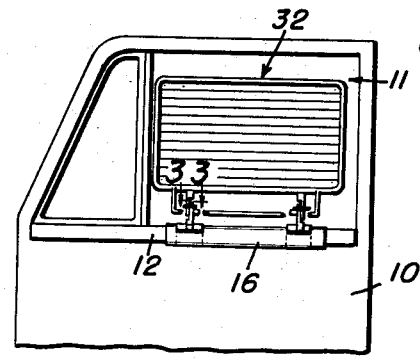
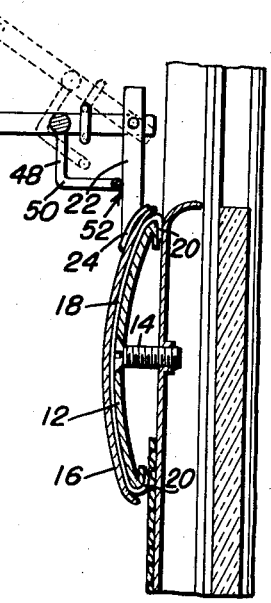
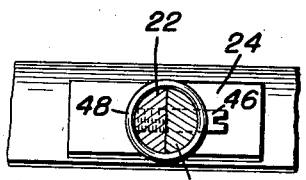
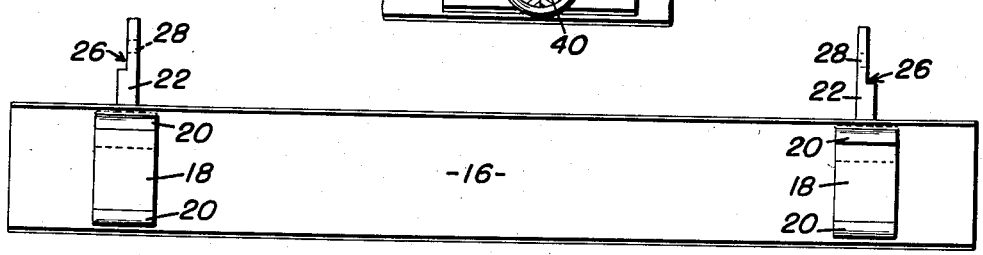
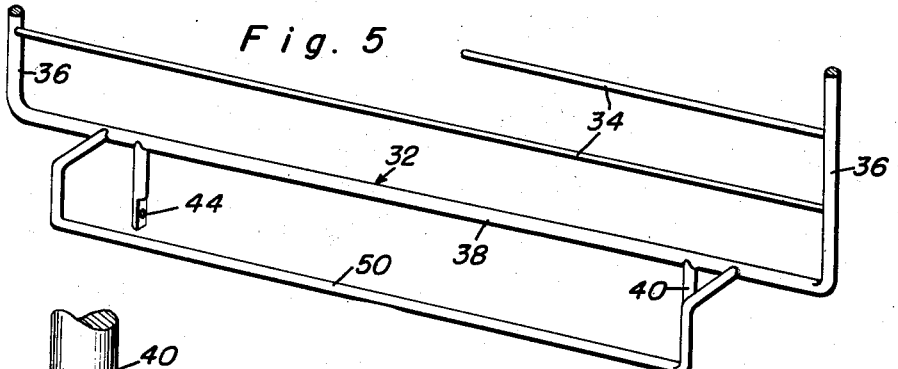
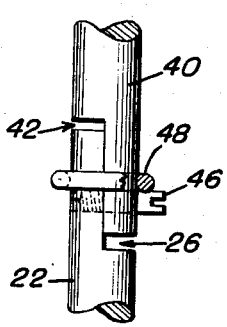
Mathew C. Kern
INVENTOR.

Patented Apr. 27, 1954

2,676,816

UNITED STATES PATENT OFFICE 2,676,816

COMBINED WINDOW GUARD AND TRAY FOR VEHICLES

Mathew C. Kern, Fort Smith, Ark.

Application January 26, 1953, Serial No. 333,121

4 Claims. (Cl. 280—150)

1

This invention relates to a combined window guard and tray, and more particularly to a combined window guard and tray for vehicles, and preferably for the rear windows thereof.

An object of this invention is to provide a guard and tray assembly for windows which will be attractive yet functional.

Another object is to prevent children from projecting their arms, legs or any portion of their bodies outwardly from a window opening of moving vehicles or the like.

Another object is to provide a window tray for use at "drive-ins" or whenever a convenient tray is desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevation from the interior of a vehicle and showing a door to which the device is applied;

Figure 2 is a vertical section through the door, showing in full lines the tray in its lowered position, and indicating by a dotted line the tray partially raised;

Figure 3 is a horizontal section taken upon an enlarged scale along line 3—3 of Figure 1;

Figure 4 is a plan view of the base portion of the device;

Figure 5 is a detail perspective view of a section of the combined tray and guard; and Figure 6 is a detail elevation showing the manner of attaching the base to the guard.

Referring now more particularly to Figures 1 and 2, reference numeral 10 indicates the interior surface of a vehicle door to which the combined window guard and tray may be applied. Such door usually includes a garnish molding 12 secured thereto adjacent window opening 11 by suitable bolts 14 and this invention contemplates the use of this molding as a securing point. An elongated base or support 16, of slightly greater width than the molding 12 and arcuate in cross-section to conform to the shape of the molding, is provided on the concave side thereof with a pair of spaced arcuate clips 18. These clips may be attached, as by spot welding, at their centers to base 16. The clips are resilient and their unattached or free end portions normally assume a curvature of smaller radius than the molding 12. Opposite ends of the clips are formed as hooks 20 and when the base is pressed against the molding, the clips spring over and clampingly engage the molding.

On the convex side of base 16 a pair of spaced uprights 22 are attached, as by welding their lower ends 24 thereto. The upper ends of uprights 22 are notched at 26, the notches extending along a diametral plane transversely of base 16. Threaded apertures 28 are also provided in the upper ends for a purpose presently apparent.

The combined tray and guard comprises a rectangular frame 32 having a plurality of horizontal transverse rods 34 extending between opposite side members 36. To present a minimum of visual obstruction, the rods and frame are preferably rather thin, yet the rods are spaced sufficiently close to provide an effective guard and tray. An intermediate side 38 of the frame has laterally extending posts 40 thereon, the free ends of which are notched at 42 in mirror-like fashion to uprights 22. The posts are also apertured at 44 similarly to the uprights.

As clearly shown in Figures 1 and 6, the posts and uprights are juxtaposed and a pivot pin 46, one end thereof being threaded, is secured in each threaded aperture 28 and extends laterally outwardly from each post 40. In this manner, the posts are free to pivot upon the pins from a substantially vertical position adjacent window opening 11, defining a guard, to a horizontal position, as shown in Figure 2, presenting an inwardly disposed tray.

To maintain the device in the vertical or guard position, a latching ring 48 is provided. As seen from Figure 6, the internal diameter of the ring is substantially the same as the external diameter of the post 40 and upright 22 and, when in the position shown, relative movement between members 22 and 40 is prevented. It will be noted that in the latched position, ring 48 is maintained in proper position, by virtue of its own weight, supported by pivot pin 46.

In order that the tray or guard may assume a horizontal position when latching ring 48 is moved upwardly to release the same for pivotal movement, a support leg member 50 is provided on side 38 of the frame 32 and, when the device is in the horizontal position as shown in full lines in Figure 2, this member abuts uprights 22 at 52.

The device may be used either on the forward right-hand window or on the rear windows, or may be used on all of these, as desired.

From the foregoing, the construction and operation of the device will be readily understood and further explanation is believed to be unnecessary.

However, since numerous changes and modifications will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a combined window guard and tray for vehicles, means adapted to engage a portion of the vehicle adjacent a window thereof and including an upstanding first lug, a combined guard and tray including a frame swingably mounted on said lug, said frame being substantially rectangular in shape and including side members having a plurality of transverse rods extending therebetween, a second lug projecting outwardly from an edge of said frame substantially in the plane of the frame, said first and second lugs having overlapping end portions, means pivotally securing said overlapping end portions to one another including a stop portion projecting exteriorly from said lugs, a latching ring slidably disposed on said second lug and movabe over said overlapping end portions to lock said lugs in alignment whereby the frame is disposed in an upright position within the window opening to form a window guard, said stop portion engaging said ring when the lugs are in alignment to limit movement of the ring in one direction.

2. The combination of claim 1 wherein an angulated supporting member extends from said frame to engage said first lug when the latch ring is released and said frame swung to a down position to constitute a tray.

3. The combination of claim 1 wherein said overlapping ends are of reduced cross-section to provide a uniform cross-section for said lugs when they are in alignment.

4. In a combined window guard and tray for vehicles, supporting means adapted to engage a portion of a vehicle adjacent a window thereof, a guard and tray assembly comprising a rectangular frame having spaced side members and a plurality of transverse rods extending therebetween, means attaching said assembly to said supporting means for swinging said frame from a guarding position within the window opening to a tray position to one side of the window opening, said attaching means including aligned posts attached at their remote ends to said frame and said supporting means, said posts being pivotally jointed at their adjacent ends, and means locking said posts in alignment with one another to hold the frame in guarding position, and stop means on said frame engaging said attaching means to retain the frame in its tray position upon release of said locking means.

References Cited in the file of this patent

UNITED STATES PATENTS

| Number | Name | Date |
|---|---|---|
| 1,596,795 | Blakeney | Aug. 17, 1926 |
| 2,356,131 | Tracy | Aug. 22, 1944 |
| 2,593,222 | Tracy | Apr. 15, 1952 |

FOREIGN PATENTS

| Number | Country | Date |
|---|---|---|
| 47,195 | Denmark | Apr. 10, 1933 |